Figure 1:
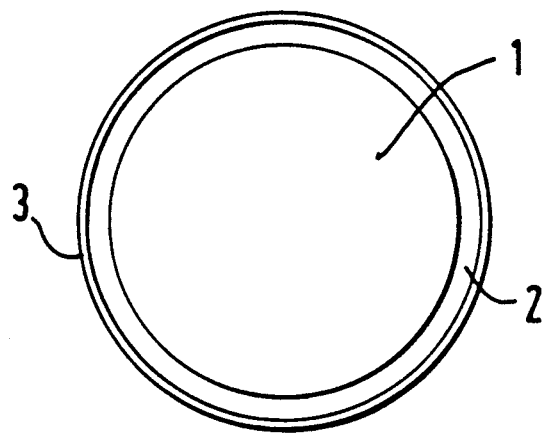

United States Patent [19]

Wahl et al.

[11] Patent Number: 5,004,545

[45] Date of Patent: Apr. 2, 1991

[54] CERAMIC FOAM FILTER APPARATUS

[75] Inventors: Hans-Peter Wahl, Velen; Rudolf Schlueter, Velen-Ramsdorf; Wolfgang P. Kaettlitz, Borken; Rolf Loos, Zuelpich, all of Fed. Rep. of Germany

[73] Assignee: Foseco International Limited, Birmingham, England

[21] Appl. No.: 544,945

[22] Filed: Jun. 28, 1990

[30] Foreign Application Priority Data

Jul. 22, 1989 [GB] United Kingdom ................ 8916839

[51] Int. Cl.⁵ .......................... C22B 9/02; C22B 21/06
[52] U.S. Cl. .................................. 210/510.1; 210/450; 210/455; 266/227; 75/412; 55/523
[58] Field of Search ...................... 210/450, 455, 510.1; 266/227, 236; 75/412; 55/523

[56] References Cited

U.S. PATENT DOCUMENTS 4,092,153 5/1978 Yarwood et al. .................. 75/68
4,331,621 5/1982 Brockmeyer .................... 264/44
4,640,497 2/1987 Heamon .......................... 266/227

FOREIGN PATENT DOCUMENTS

84/8579 11/1984 South Africa .

Primary Examiner—Robert A. Dawson
Assistant Examiner—David Reifsnyder
Attorney, Agent, or Firm—Nixon & Vanderhye

[57] ABSTRACT

A filter for use in the filtration of molten metals comprises a ceramic foam having a gasket made from fibrous material surrounding its peripheral surface and a metallic foil, such as aluminum foil, fixed to the gasket, for example by means of an adhesive, around the outer peripheral surface of the gasket.

7 Claims, 1 Drawing Sheet

CERAMIC FOAM FILTER APPARATUS

This invention relates to filters for use in the filtration of molten metals.

Cellular ceramic filters in the form of ceramic foams or honeycomb structures having cells extending from one face to an opposite face are commonly used for filtering molten metals prior to or during casting.

Due to dimensional variations in ceramic foam filters of a particular nominal size, and in the case of filtration of molten metal in a permanent mould or die due to erosion of the die surface or to variation in the thickness of the coating which may be applied to the die surface, there is a tendency for metal to bypass the filter around its outer surface so that some unfiltered metal can pass through the apparatus or into the mould or die. In extreme cases the filter may actually move out of its proper location during casting. Filtration efficiency is therefore decreased and non-metallic inclusions can be formed in the cast metal.

It is known to use a gasket made from ceramic fibre to surround the surface of a ceramic foam filter which mates with part of the filtration apparatus or with the mould or die in order to fix and seal the filter in position. As the gasket is relatively soft it is not wear resistant and can be damaged during transportation or handling, and fibres can become detached from the gasket and pass through the filtration apparatus or into the mould or die.

It has now been found that the above problems can be overcome by surrounding the fibre gasket with metallic foil.

According to the invention there is provided a ceramic foam filter having its peripheral surface surrounded by a gasket made from fibrous material characterised in that metallic foil is fixed to the gasket around the outer peripheral surface of the gasket.

The horizontal cross-section of the ceramic filter may be any desired shape but will usually be circular, square or rectangular.

The gasket may be made from a soft, flexible strip of ceramic fibrous material, which is preferably free of organic compounds so as to avoid the possibility of hydrogen pick-up by the metal when filtering a metal such as aluminium. The thickness of the strip will usually be from 3 to 6 mm, and such a strip is compressible to 1 to 2 mm. Alternatively the gasket may be made from a woven glass fibre cloth. The width of the gasket may be the same as the thickness of the filter or less than the thickness of the filter.

The metallic foil should be made of a metal which is the same as or is compatible with the metal being cast. Aluminium foil is preferred. The metallic foil can be fixed to the gasket by means of an adhesive. A self-adhesive aluminium foil is preferred. The amount of adhesive used should be as small as possible in order to minimise the possibility of contamination of the metal. The width of the metallic foil may be the same as the width of the gasket or slightly larger so that the gasket including its edges is fully enclosed by the foil. The thickness of the foil is preferably 0.01 to 0.10 mm.

The gasket of the filter of the invention enables the filter to be fixed and sealed in position in metal filtration apparatus or in a permanent mould or die, thus avoiding movement of the filter during filtration and bypass of metal around the filter. The metallic foil prevents fibre loss from the gasket during transportation, handling or use, particularly when the edges of the gasket are enclosed by the metallic foil and the smooth surface of the metallic foil facilitates insertion of the filter in filtration apparatus or in a mould or die. When the gasket is fully enclosed by the metallic foil direct contact of the gasket by molten metal is also prevented.

The filter of the invention is of particular value in the gravity diecasting or low pressure die-casting of aluminium or aluminium alloys in metal dies.

Figure 2:
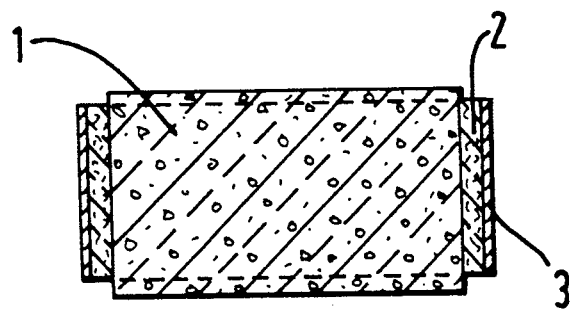

The invention is illustrated by way of example with reference to the accompanying drawings in which FIG. 1 is a top plan view of a ceramic foam filter according to the invention and FIG. 2 is a vertical cross-section of the filter of FIG. 1.

Referring to the drawings a ceramic foam filter 1 of a cylindrical shape has a gasket 2 made of a soft, flexible strip of ceramic fibrous material around its peripheral surface and self-adhesive aluminium foil 3 fixed to the gasket 3 around the outer peripheral surface of the gasket 2.

Seventy filters as shown in the drawings were used in the casting of aluminium wheels in a low pressure die-casting foundry. The alloy was LM9 type and it was cast at approximately 730° C. Each casting weighed approximately 7 kg.

The filters consisted of ceramic foam measuring 38 mm in diameter and 22 mm in thickness, and having a porosity of 10 pores per inch (4 pores per cm). The periphery of each of the filters was surrounded by a gasket of ceramic fibrous material having a width of 19 mm and a thickness of 3 mm. Self-adhesive aluminium foil 19 mm wide and 0.05 mm thick was fixed to the outer periphery of the gasket. All the wheels were X-rayed, pressure tested and machined and no defects were found.

We claim:

1. A ceramic foam filter having its peripheral surface surrounded by a gasket made from fibrous material and having metallic foil fixed to the gasket around the outer peripheral surface of the gasket.

2. A ceramic foam filter according to claim 1 wherein the metallic foil is aluminium foil.

3. A ceramic foam filter according to claim 1 wherein the metallic foil is fixed to the gasket by means of an adhesive.

4. A ceramic foam filter according to claim 1 wherein the metallic foil has a width which is slightly larger than the width of the gasket so that the gasket including its edges is fully enclosed by the foil.

5. A ceramic foam filter according to claim 1 wherein the metallic foil has a thickness of 0.01 to 0.10 mm.

6. A ceramic foam filter according to claim 1 wherein the gasket is made from a soft, flexible strip of ceramic fibrous material.

7. A ceramic foam filter according to claim 1 wherein the gasket is made from a woven glass fibre cloth.

* * * * *